United States Patent Office 3,272,820
Patented Sept. 13, 1966

3,272,820
4-NITROSO 1-PIPERAZINETHIOCARBOXYLATES
John J. D'Amico, Dunbar, W. Va., assignor to Monsanto Company, St. Louis, Mo., a corporation of Delaware
No Drawing. Filed Jan. 22, 1965, Ser. No. 427,473
13 Claims. (Cl. 260—268)

This application is a continuation-in-part of abandoned application Serial No. 112,510 filed May 25, 1961.

This invention relates to a new class of piperazines. A valuable subclass of the new compounds useful as herbicides possess the formula

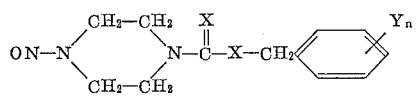

where X is oxygen or sulfur at least one of which is sulfur, Y is halogen and $n$ is an integer greater than zero but less than five, preferably two or three.

The halogen substituents are preferably chlorine but bromine and to a lesser extent fluorine and iodine are also suitable. Not more than four halogen atoms should be present. Whether the number of halogens is two, three, or four, it is preferred that the 2- and 6-positions are occupied by halogen.

The halobenzyl esters of 4-nitroso 1-piperazinecarbothionic acid may be prepared by condensing a halobenzyl xanthate with sodium monochloroacetate and the product treated with 4-nitrosopiperazine. The halobenzyl esters of 4-nitroso 1-piperazinecarbodithioic and 4-nitroso 1-piperazinecarbothiolic acids may be prepared by condensing a halogenated benzyl halide with the carbodithioic or carbothiolic acid. However, the free acids are of limited stability and are preferably used in the form of their salts. The condensations go readily in aqueous medium with water-soluble salts, as for example alkali metal or ammonium salts. Substituted ammonium salts, also known as amine addition salts, can be used; as for example triethylamine, trimethylamine, tributylamine, and other tertiary organic amine salts. The acids and salts thereof which correspond to the esters also appear to be new compounds. The carbodithioic and carbothiolic acids form readily from 4-nitrosopiperazine and carbon disulfide or carbonoxysulfide. As explained, it is preferred to carry out the condensation in the presence of either a tertiary organic amine or inorganic base. For example, sodium 4-nitroso 1-piperazinecarbodithioate formed in 100% yield by reacting 0.2 mole each of 4-nitrosopiperazine, carbon disulfide, and 25% sodium hydroxide in 200 ml. of water at 5°–15° C. The product was a 15.2% solution of the sodium salt. These methods of synthesis are illustrative only and other methods can be used where desired.

As illustrative of the new compounds there may be mentioned:

2,3,5,6-tetrachlorobenzyl 4-nitroso-1-piperazinecarbodithioate,
2,3,5,6-tetrachlorobenzyl 4-nitroso-1-piperazinecarbothiolate,
2,3,5,6-tetrachlorobenzyl 4-nitroso-1-piperazinecarbothionate,
2,3,4,5-tetrachlorobenzyl 4-nitroso-1-piperzinecarbodithioate,
2,3,4,5-tetrachlorobenzyl 4-nitroso-1-piperazinecarbothiolate,
2,3,4,5-tetrachlorobenzyl 4-nitroso-1-piperazinecarbothionate,
2,3,4-trichlorobenzyl 4-nitroso-1-piperazinecarbodithioate,
2,3,4-trichlorobenzyl 4-nitroso-1-piperazinecarbothiolate,
2,3,4-trichlorobenzyl 4-nitroso-1-piperazinecarbothionate,
2,3,5-trichlorobenzyl 4-nitroso-1-piperazinecarbodithioate,
2,3,5-trichlorobenzyl 4-nitroso-1-piperazinecarbothiolate,
2,3,5-trichlorobenzyl 4-nitroso-1-piperazinecarbothionate,
2,3,6-trichlorobenzyl 4-nitroso-1-piperazinecarbodithioate,
2,3,6-trichlorobenzyl 4-nitroso-1-piperazinecarbothiolate,
2,3,6-trichlorobenzyl 4-nitroso-1-piperazinecarbothionate,
2,4,5-trichlorobenzyl 4-nitroso-1-piperazinecarbodithioate,
2,4,5-trichlorobenzyl 4-nitroso-1-piperazinecarbothiolate,
2,4,5-trichlorobenzyl 4-nitroso-1-piperazinecarbothionate,
2,6-dichlorobenzyl 4-nitroso-1-piperazinecarbodithioate,
2,6-dichlorobenzyl 4-nitroso-1-piperazinecarbothiolate,
2,6-dichlorobenzyl 4-nitroso-1-piperazinecarbothionate,
2,6-dibromobenzyl 4-nitroso-1-piperazinecarbodithioate,
2,6-dibromobenzyl 4-nitroso-1-piperazinecarbothiolate, and
2,6-dibromobenzyl 4-nitroso-1-piperazinecarbothionate.

Salts of dithiocarbamic acids and thiuram sulfides are valuable for accelerating vulcanization of natural and synthetic rubbers. This important subclass possess the formula

where R is the 4-nitroso-1-piperazine group, $n$ is an integer equal to the valence of R', and R' is metal, ammonium, amine addition salt-forming group,

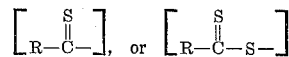

where R has the same significance as before. By metal is meant alkali metal, alkaline earth metal, magnesium, manganese, cadmium, zinc, mercury, lead, bismuth, iron, cobalt, and nickel. Amine addition salt-forming group means any of the substituted ammonium salts. Examples of amines which form such salts are trimethylamine, triethylamine, tripropylamine, triisopropylamine, tributylamine, N,N-dimethylcyclohexylamine, dicyclohexylamine, diethylamine, triethanolamine, N,N-dimethylaniline, piperazine, morpholine, piperidine, 4-nitrosopiperazines, and hexamethylenimine.

The detailed examples below illustrate the preparation and properties of the new compounds but are not to be taken as limitative.

*Example 1*

To a stirred charge containing 11.6 grams (0.1 mole) of 4-nitrosopiperazine, 16 grams (0.1 mole) of 25% sodium hydroxide and 200 ml. of water was added dropwise at 5°–15° C. 7.6 grams (0.1 mole) of carbon disulfide and stirring continued for an additional hour. To the sodium 4-nitroso-1-piperazinecarbodithioate so prepared was added 19.6 grams (0.1 mole) of 2,6-dichlorobenzyl chloride in one portion and the reaction mixture stirred at 25°–30° C. for 24 hours. After cooling to 5° C., the precipitate was collected by filtration, washed with water until the washings were neutral to litmus and air-dried at 25°–30° C. After recrystallation from benzene the 2,6-dichlorobenzyl 4-nitroso-1-piperazinecarbodithioate, obtained in 65.5% yield as a white solid, melted at 174°–175° C. Analysis gave 17.9% sulfur compared to 18.3% calculated for $C_{12}H_{13}Cl_2N_3OS_2$.

*Example 2*

In the procedure of Example 1, 23 grams (0.1 mole) of 2,3,6-trichlorobenzyl chloride was substituted for the 2,6-dichlorobenzyl chloride. The product was cooled to 0° C. and isolated as described. The 2,3,6-trichlorobenzyl 4-nitroso-1-piperazinecarbodithioate was a tan solid melting at 203°–204° C. after recrystallization from dilute acetone solution. The yield was 74.5% of theory. Analysis gave 16.5% sulfur compared to 16.7% calculated for $C_{12}H_{12}Cl_3N_3OS_2$.

Example 3

To a stirred charge containing 13.8 grams (0.12 mole) of 4-nitrosopiperazine, 16 grams (0.1 mole) of 25% sodium hydroxide, and 50 ml. of water was added in 12 minutes at 0°–5° C. 7.6 grams (0.107 mole) of 85% COS. Next there was added in one portion 23 grams (0.1 mole) 2,3,6-trichlorobenzyl chloride and stirring continued for an hour at 0°–10° C., a second hour at 10°–15° C., a third hour at 15°–20° C., and for 24 hours at 25–30° C. To the reaction mixture was then added 250 ml. of water and the solution stirred at 25°–30° C. for an additional 15 minutes. The precipitate was collected by filtration, washed with water until the washings were neutral to litmus, and air-dried at 25°–30° C. 2,3,6-trichlorobenzyl 4-nitroso-1-piperazinecarbothiolate was obtained as a white solid in 57.1% yield. After recrystallization from ethyl acetate the product melted at 173°–175° C. Analysis gave 28.7% chlorine compared to 28.8% calculated for $C_{12}H_{12}Cl_3N_3O_2S$.

Example 4

Substituting 19.5 grams (0.1 mole) of 2,6-dichlorobenzyl chloride for the 2,3,6-trichlorobenzyl chloride in Example 3, 2,6-dichlorobenzyl 4-nitroso-1-piperazinecarbothiolate was obtained as a white solid in 68.5% theory yield. After recrystallization from ethyl acetate the product melted at 120°–122° C. Analysis gave 21.2% chlorine, the calculated value for $$C_{12}H_{13}Cl_2N_3O_2S$$

Example 5

The trichlorobenzyl chloride used in the preparation of this example may be prepared by the following procedure: Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperature was increased to about 70° C. in order to keep the mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Alternatively, the iron may be removed by distillation of the chlorinated product. The product was then chlorinated at 160° C. in the presence of ultra violet light until the gain in weight was that calculated for trichlorobenzyl chloride. Analysis of the product for chlorine at this point gave 61.8%.

Condensation with 4-nitrosopiperazine was effected as follows: A solution comprising 11.6 grams (0.1 mole) of 4-nitrosopiperazine, 16 grams (0.1 mole) of 25% sodium hydroxide, and 200 ml. of water was prepared and 7.6 grams (0.1 mole) of carbon disulfide added dropwise at 5°–15° C. The reaction mixture was then stirred at 25°–30° C. for one hour and 20.7 grams (0.09 mole) of ar,ar,ar-trichlorobenzyl chloride added in one portion. The product was then stirred at 25°–30° C. for 24 hours, 50 ml. of ethyl ether added, and the solution cooled to 5° C. The product was collected by filtration, washed with 200 ml. of water, and air-dried at 25°–30° C. ar,ar,ar-Trichlorobenzyl 4-nitroso-1-piperazinecarbodithioate was obtained as a white solid melting at 155°–164° C.

Example 6

To a stirred charge containing 18.9 grams (0.2 mole) of chloroacetic acid and 100 ml. of water was added in small portions enough sodium carbonate to give a pH of 8. After stirring the charge at 15°–20° C. for 15 minutes, 68 grams (0.2 mole) of potassium 2,3,6-trichlorobenzylxanthate monohydrate was added in one portion and stirring continued for one hour at 25°–30° C. Then 34.6 grams (0.3 mole) of 4-nitrosopiperazine was added in one portion and the reaction mixture stirred at 25°–30° C. for 18 hours. The resulting precipitate was collected by filtration, washed with water until the washings were neutral to litmus, and air-dried at 25°–30° C. This precipitate was slurried with 100 ml. of ethyl ether, filtered, and air-dried at 25°–30° C. 2,3,6-trichlorobenzyl 4-nitroso-1-piperazinecarbothionate was obtained in 68.6% yield as a white solid melting at 169°–171° C. after recrystallization from acetone. Analysis gave 9.1% sulfur and 28.7% chlorine compared to 8.7% sulfur and 28.8% chlorine calculated for $C_{12}H_{12}Cl_3N_3O_2S$.

The intermediate potassium 2,3,6-trichlorobenzylxanthate monohydrate was prepared by the following procedure: A charge comprising 43 grams (0.2 mole) of 2,3,6-trichlorobenzyl alcohol and 500 ml. of heptane was heated with stirring to 70° C. The solution was then cooled to 30° C. and 12.6 grams (0.2 mole) of 90% potassium hydroxide added in one portion. After stirring at 25°–39° C. for 6 hours, 22.8 grams (0.3 mole) of carbon disulfide was added and stirring continued at 25°–30° C. for an additional 18 hours. The precipitate was collected by filtration, washed with 200 ml. of ethyl ether, and dried at 25°–30° C. The xanthate was obtained in 100% yield as a light yellow solid.

Example 7

To a stirred charge containing 46 grams (0.4 mole) of 4-nitrosopiperazine, 40.5 grams (0.4 mole) of triethyl amine, and 400 ml. of ethyl ether was added dropwise at 5°–15° C., 30.4 grams (0.4 mole) of carbon disulfide and stirring continued at 25°–30° C. for three hours. The precipitate was collected by filtration and air-dried at 25°–30° C. After recrystallization from alcohol, the triethylamine salt of 4-nitroso-1-piperazinecarbodithioic acid, obtained in 92.5% yield as a white solid, melted at 100°–102° C. Analysis gave 22.2% sulfur compared to 21.9% calculated for $C_{11}H_{24}N_4OS_2$.

Example 8

In the procedure of Example 7, the charge consisted of 23 grams (0.2 mole) of 4-nitrosopiperazine, 300 ml. of ethyl ether, and 7.6 grams (0.1 mole) of carbon disulfide. The 4-nitroso-1-piperazine salt of 4-nitroso-1-piperazine carbodithioic acid, obtained in 97.5% yield as a white solid, melted at 133°–135° C. Analysis gave 21.0% sulfur compared to 20.9% calculated for $$C_9H_{18}N_6O_2S_2$$

Example 9

To a stirred charge containing 5.8 grams (0.05 mole) of 4-nitrosopiperazine, 8 grams (0.05 mole) of 25% sodium hydroxide, and 150 ml. of water was added dropwise at 5°–15° C., 3.8 grams (0.05 mole) of carbon disulfide. After stirring for an hour at 25°–30° C., 3.4 grams (0.025 mole) of zinc chloride dissolved in 200 ml. of water was added in one portion and stirring continued for another hour. The precipitate was collected by filtration, washed with water until the washings were neutral to litmus, and air-dried at 25°–30° C. Zinc 4-nitroso-1-piperazinecarbodithioate was obtained in 89.5% as a white solid melting above 300° C. Analysis gave 29.1% sulfur compared to 28.8% calculated for $C_{10}H_{16}N_6O_2S_4Zn$.

Example 10

Substituting an equimolar portion of cadmium sulfate hydrate dissolved in 200 ml. of water for the zinc chloride solution in Example 9, cadmium 4-nitroso-1-piperazinecarbodithioate was obtained in 97.5% yield as a light-yellow solid melting above 300° C. Analysis gave 25.9% sulfur compared to 26.0% calculated for $$C_{10}H_{16}N_6O_2S_4Cd$$

Example 11

In the procedure of Example 9, 11.9 grams (0.05 mole) of nickel chloride hydrate dissolved in 500 ml. of water was substituted for the zinc chloride solution. The product was stirred at 25°–30° C. for two hours and isolated as described. The nickel (II) 4-nitroso-1-piperazinecarbodithioate, obtained in 100% yield, was a green solid melting above 300° C. Analysis gave 29.2% sulfur, the calculated value for $C_{10}H_{16}N_6O_2S_4Ni$.

Example 12

Copper (II) 4-nitroso-1-piperazinecarbodithioate was obtained by substituting an equimolar portion of copper sulfate hydrate. The yield was 99% of a green solid melting above 300° C. Analysis gave 29.4% sulfur compared to 28.9% calculated for $C_{10}H_{16}N_6O_2S_4Cu$.

Closely related to the carbothioates in structure are the thiuram compounds, both the thiuram mono- and disulfides, as shown in the following examples.

Example 13

To a stirred charge containing 23 grams (0.2 mole) of 4-nitrosopiperazine, 32 grams (0.2 mole) of 25% sodium hydroxide, and 300 ml. of water was added, dropwise at 5°–15° C., 15.2 grams (0.2 mole) of carbon disulfide and stirring continued at 25°–30° C. for an additional hour. After cooling to 0° C., 25.2 grams (0.11 mole) of ammonium persulfate dissolved in 200 ml. of water was added at 0°–10° C. in 2 hours. Stirring was continued at 0°–10° C. for 30 minutes, the precipitate collected by filtration, washed with 500 ml. of water, and air-dried at 25°–30° C. Bis(4-nitroso-1-piperazinethiocarbonyl)disulfide was obtained in 65.6% yield as a white solid melting at 190°–192° C. Analysis gave 33.7% sulfur, the calculated value for $C_{10}H_{16}N_6O_2S_4$.

Example 14

A slurry containing 34 grams (0.089 mole) of the product of Example 13, 6.4 grams (0.098 mole) of potassium cyanide, and 600 ml. of water was stirred at 25°–30° C. for 6 hours. The precipitate was collected by filtration, washed with water until the washings were neutral to litmus, and air-dried at 45° C. Bis(4-nitroso-1-piperazinethiocarbonyl)sulfide was obtained in 84% yield as a light tan solid melting at 154°–156° C. after recrystallization from ethyl acetate/acetone. Analysis by Dumas method gave 24.0% nitrogen compared to 24.1% calculated for $C_{10}H_{16}N_6O_2S_3$.

Herbicidal compositions may be prepared by admixing the piperazine with a carrier material in order to provide formulations adapted for ready and efficient application in liquid or solid form. Solid compositions are formulated by mixing the toxicant with a finely divided or granular solid, as for example tricalcium phosphate, calcium carbonate, kaolin, bole, kieselguhr, talc, bentonite, fuller's earth, pyrophyllite, diatomaceous earth, calcinated magnesia, volcanic ash, sulfur, and the like inorganic solid materials, and include for example, such materials of organic nature as powdered cork, powdered wood, and powdered walnut shells. The preferred solid carriers are the adsorbent clays, e.g. bentonite. These mixtures can be used for herbicidal purposes in the dry form, or, by addition of water-soluble surfactants, the dry particular solids can be rendered wettable by water so as to obtain stable aqueous dispersions or suspensions suitable for use as sprays. The carrier will be in major proportion and the toxicant, while less than 50% of the composition, will be present in herbicidally effective proportion.

Useful properties as herbicides are illustrated by applying the piperazines as aqueous sprays to germinating seedlings. The active ingredient was emulsified in water and applied to seeded soil at the rate of 5 pounds per acre. About fourteen days after application of the toxicants, results were observed and recorded. The number of seeds emerging was converted to weighted herbicidal ratings based on average percent germination of any particular seed lot times and injury factor. This evened irregularities of herbicide ratings of seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

| Percent emergence: | Phytotoxicity rating |
|---|---|
| 0–25% | 3 or severe. |
| 26–50% | 2 or moderate. |
| 51–75% | 1 or slight. |
| 76–100% | 0 or none. |

The phytotoxicities are recorded below:

TABLE I

| Toxicant | Results Observed |
|---|---|
| 2,6-dichlorobenzyl 4-nitroso-1-piperazinecarbodithioate. | Moderate phytotoxicity to morning glory, pigweed, and soybean. |
| 2,3,6-trichlorobenzyl 4-nitroso-1-piperazinecarbodithioate. | Severe phytotoxicity to morning glory, sugar beet, crab grass, pigweed, soybean, wild buckwheat, and tomato; moderate phytotoxicity to mustard (radish) and foxtail. |
| 2,3,6-trichlorobenzyl 4-nitroso-1-piperazinecarbothiolate. | Severe phytotoxicity to morning glory, sugar beet, pigweed, soybean, and tomato. |
| 2,6-dichlorobenzyl 4-nitroso-1-piperazinecarbothiolate. | Severe phytotoxicity to pigweed. |
| ar,ar,ar-Trichlorobenzyl 4-nitroso-1-piperazinecarbodithioate. | Moderate phytotoxicity to morning glory, pigweed, and soybean. |

Formative effects were exerted in most cases.

Greater efficiency than from surface application results from incorporating the toxicants into the top layer of soil. Phytotoxicity ratings observed by incorporating the piperazines into the surface soil at a concentration of ¼ pound per acre are recorded below:

TABLE II

| Toxicant | Results Observed |
|---|---|
| 2,3,6-trichlorobenzyl 4-nitroso-1-piperazinecarbodithioate. | Severe phytotoxicity to morning glory, sugar beet, pigweed, and soybean; moderate phytotoxicity to wild buckwheat and tomato. |
| 2,3,6-trichlorobenzyl 4-nitroso-1-piperazinecarbothiolate. | Severe phytotoxicity to soybean; moderate phytotoxicity to morning glory, mustard (radish), sugar beet, and pigweed. |

At 0.15 pound per acre 2,3,6-trichlorobenzyl 4-nitroso-1-piperazinecarbodithioate was still severely toxic to pigweed and soybean and moderately toxic to morning glory.

The term "surfactant" as employed in the specification and in the appended claims is used as in Volume II of Schwartz, Perry and Berch's "Surface Active Agents and Detergents" (1958, Interscience Publishers, Inc., New York) in place of the expression "emulsifying agent" to connote generically the various "dispersing agents," "wetting agents," and "spreading agents" that are adapted to be admixed with the active compounds of this invention in order to secure better wetting and spreading of the compound in water vehicle or carrier in which it is insoluble through lowering the surface tension of the water (see also Frear "Chemistry of Insecticides, Fungicides and Herbicides," second edition, page 280). These surfactants include the well-known capillary-active substances which may be anion-active (or anionic), cation-active (or cationic), or non-ionizing (or non-ionic), which are described in detail in Volumes I and II of Schwartz, Perry and Berch's "Surface Active Agents and Detergents" (1958, Interscience Publishers, Inc., New York), and also in the November 1947 issue of Chemical Industries (pages 811–824) in an article entitled "Synthetic Detergents" by John W. McCutcheon and also in the July, August, September, and October 1952, issues of Soap and Sanitary Chemicals under the title "Synthetic Detergents." The preferred surfactants are the water-soluble anionic surface-active agents and the water-soluble non-ionic surface-active agents set forth in U.S. 2,846,398 (issued August 5, 1958). In general, it is preferred that a mixture of water-soluble anionic and water-soluble non-ionic surfactants be employed. Generally, the surfactant will comprise only a small proportion of the composition, say 0.1–15% by weight of the toxicant. Solution of the toxicant in organic solvents containing small amounts of surfactant provides versatile herbicidal compositions useful for direct application to soil or for preparing aqueous sprays. Emulsifiable concentrates may be prepared by dissolving the toxicant in heavy aromatic naphtha and incorporating about 5% of the total composition of surfactant. The particular dosage to be applied in a given situation can be readily determined by those skilled in the art by conventional techniques. It depends upon the formulation, type of vegetation to be controlled, climatic conditions, and the particular toxicant used. Compositions containing the active ingredient in a concentration within the range of 0.1–15.0% by weight applied to constitute total dosage of active ingredient within the range of 0.1–100 pounds per acre comprise the ranges usually employed.

As exemplary of the accelerating activity, a rubber base stock was compounded comprising:

| | Parts by weight |
|---|---|
| Smoked sheet rubber | 100.0 |
| Carbon black | 50.0 |
| Zinc oxide | 5.0 |
| Stearic acid | 3.0 |
| Saturated hydrocarbon softener | 3.0 |
| Sulfur | 2.0 |
| Antioxidant | 2.0 |

To the base composition was added 0.5 part by weight of accelerator and the composition cured by heating for different periods of time at 144° C. The physical properties at optimum cure were as follows:

TABLE III

| Accelerator | Modulus at 300% Elong., lbs./in.² | Tensile at Break in, lbs./in.² | Ultimate Elongation, percent |
|---|---|---|---|
| 1-nitrosopiperazine 4-nitroso-1-piperazinecarbodithioate | 1,300 | 1,700 | 370 |
| Bis(4-nitroso-1-piperazinethiocarbonyl)sulfide | 1,230 | 1,700 | 370 |

Further illustrative of accelerating properties, a stock was compounded comprising:

| | Parts by weight |
|---|---|
| Smoked sheet rubber | 100.0 |
| Carbon black (Philblack 0) | 50.0 |
| Zinc oxide | 5.0 |
| Stearic acid | 3.0 |
| Saturated hydrocarbon softener | 3.0 |
| Antioxidant | 1.0 |
| Sulfur | 2.5 |
| Bis(4-nitroso-1-piperazinethiocarbonyl)disulfide | 0.5 |

After curing the stock in the usual manner in a press for 60 minutes at 144° C., the modulus of elasticity at 300% elongation was 1130 and the tensile at break was 2360 lbs./in.²

Also, 4-nitroso-1-piperazinethiocarboxylates are useful intermediates. Under basic conditions, as for example by treatment with urea, the nitroso group can be removed. Reduction of the nitroso group in known manner leads to hydrazine type compounds.

It is intended to cover all changes and modifications of the examples of the invention herein chosen for purposes of disclosure which do not constitute departures from the spirit and scope of the invention.

What is claimed is:
1. A compound selected from the group consisting of
(a) compounds of the formula

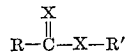

where R is the 4-nitroso-1-piperazine group, X is selected from the group consisting of oxygen and sulfur, one X being sulfur and the other oxygen, and R' is selected from the group consisting of alkali metal, ammonium, amine addition salt-forming group, and halogen-substituted benzyl, the halogen substituents being at least two but less than five and
(b) compounds of the formula

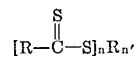

where R is the 4-nitroso-1-piperazine group, $n$ is an integer equal to the valence of R', and R' is selected from a group consisting of metal, ammonium, amine addition salt-forming group, halogen-substituted benzyl, the halogen substituents being at least two but less than five,

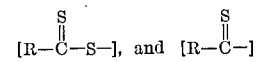

and
when R is the same significance as before.
2. A compound of the formula

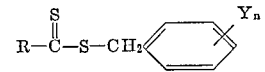

where R represents the 4-nitroso-1-piperazine group, Y is halogen, and $n$ is an integer at least two but less than five.
3. A compound of the formula

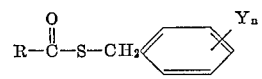

where R represents the 4-nitroso-1-piperazine group, Y is halogen, and $n$ is an integer at least two but less than five.
4. A compound of the formula

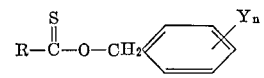

where R represents the 4-nitroso-1-piperazine group, Y is halogen, and $n$ is an integer at least two but less than five.
5. A compound of the formula

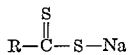

where R represents the 4-nitroso-1-piperazine group.
6. A compound of the formula

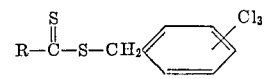

where R represents the 4-nitroso-1-piperazine group.
7. A compound of the formula

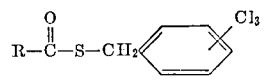

where R represents the 4-nitroso-1-piperazine group.

8. A compound of the formula

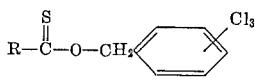

where R represents the 4-nitroso-1-piperazine group.

9. 2,3,6-trichlorobenzyl 4-nitroso-1-piperazinecarbodithioate.

10. 2,3,6-trichlorobenzyl 4-nitroso-1-piperazinecarbothiolate.

11. 2,3,6-trichlorobenzyl 4-nitroso-1-piperazinecarbothionate.

12. The 4-nitroso-1-piperazine salt of 4-nitroso-1-piperazine carbodithioic acid.

13. A compound of the formula

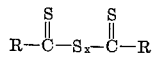

where R is the 4-nitrosopiperazine group and $x$ is an integer at least one but less than three.

No references cited.

ALEX MAZEL, *Primary Examiner.*

JAMES W. ADAMS, *Assistant Examiner.*